United States Patent [19]

Claycomb

[11] 4,257,442
[45] Mar. 24, 1981

[54] CHOKE FOR CONTROLLING THE FLOW OF DRILLING MUD

[76] Inventor: Jack R. Claycomb, 8226 Waynemen, Houston, Tex. 77040

[21] Appl. No.: 18,508

[22] Filed: Mar. 8, 1979

Related U.S. Application Data

[63] Continuation-in-part of Ser. No. 727,031, Sep. 27, 1976, Pat. No. 4,190,073.

[51] Int. Cl.³ .............................................. F16K 5/00
[52] U.S. Cl. ............................. 137/238; 137/329.02; 137/329.03; 137/329.04; 166/320; 175/38; 251/63; 251/324; 251/333
[58] Field of Search .............. 137/238, 329.02, 329.03, 137/329.04, 516.25, 329.01; 251/63, 333, 35, 210, 324; 166/91, 320; 175/38

[56] References Cited

U.S. PATENT DOCUMENTS

| 662,249 | 11/1900 | Cadman | 137/329.03 |
|---|---|---|---|
| 855,517 | 6/1907 | Nicodemus | 251/333 |
| 1,006,564 | 10/1911 | Kinsey, Jr. | 137/329.04 |
| 1,193,849 | 8/1916 | Viger | 251/333 |
| 1,202,044 | 10/1916 | Fisher | 251/333 |
| 2,634,754 | 4/1953 | Rahn | 251/63 |
| 3,064,675 | 11/1962 | Johnson et al. | 251/63 |
| 3,703,908 | 11/1972 | Tellier | 251/333 |

Primary Examiner—Martin P. Schwadron
Assistant Examiner—G. L. Walton
Attorney, Agent, or Firm—Gunn, Lee & Jackson

[57] ABSTRACT

This apparatus disclosed in its preferred form is a choke for controlling the flow of drilling mud which is highly abrasive. The abrasive drilling mud is introduced through a lateral port and an elongate, tubular body. In the tubular body, a fluid actuated, double acting piston is forced to a choke control position. The piston has appended to it a centralized, tubular extension which receives a sleeve of wear resistant material. The sleeve is positioned in a circular chamber communicated to the lateral port where the drilling mud is introduced. It travels toward a seat downstream of the body. The seat is formed of hardened material. The downstream outlet of the body is additionally lined with a wear resistant sleeve. An alternate embodiment is also disclosed. A hydraulic control system for operation of the choke is also disclosed.

10 Claims, 4 Drawing Figures

CHOKE FOR CONTROLLING THE FLOW OF DRILLING MUD

RELATED APPLICATIONS

This is a continuation-in-part of Ser. No. 727,031 filed Sept. 27, 1976, now U.S. Pat. No. 4,190,073.

BACKGROUND OF THE PROBLEM

In the drilling of an oil well, the drilling lubricant is called drilling mud. It picks up cuttings from the bottom of the well and carries them to the top of the well and then to a mud pit where the chips or cuttings are separated. This permits the mud to be recycled and used again. The fluid flow system involving the mud is a high pressure system; accordingly, it is necessary to control this flow system with a choke. Chokes, however, run into great difficulties in that the mud and the cuttings carried by it are very abrasive. Because they are abrasive, they rapidly destroy the valve and seat mechanism in the choke.

The success or failure of the prior art devices is somewhat subjective dependent on the goals; nevertheless, the present apparatus meets a need and provides a solution for that need as is disclosed hereinafter. The improved relative wear factors and the related shutdown of equipment to replace the choke yields some evidence of the efficacy of the present apparatus and, in particular, point out how this device is able to control the highly abrasive volume of mud which flows through the mud handling system. It is very desirable maintain a regulated back pressure in the system; accordingly, control of this back pressure through the use of the present device and, in particular, the longevity of the device, signify the value thereof.

SUMMARY OF THE DISCLOSURE

The choke of the present device is an elongate, tubular housing having in one end a closure or plug which entraps a fluid operated piston. The piston is made double acting by applying pressure to both faces controllably. The piston has a centralized plug appended to it which receives thereabout a valve member formed of an extremely hard material. It is located in a circular chamber which communicates with a lateral port where the mud flow from the well is introduced. The lateral port is directed at the valve element which is able to withstand the wear of the flow.

The apparatus further includes a circular valve seat which is inserted downstream. The valve seat is also made of hardened material. It has a tapered leading edge. It has an edge which matches or mates with the valve element, itself. As the two are brought together, they close off the passage through the choke. The valve seat is a hollow, circular ring which communicates with an outlet passage.

An alternate embodiment is disclosed wherein the movable valve body is supported on a central, movable, hydraulically driven support mechanism. It is covered over at the nose by means of an insert plate of hardened material to avoid cutting. Additionally, it incorporates a ring which locks the wear members together so that they can be selectively removed or replaced.

DETAILED DESCRIPTION OF THE PREFERRED EMBODIMENT

Figure 1:
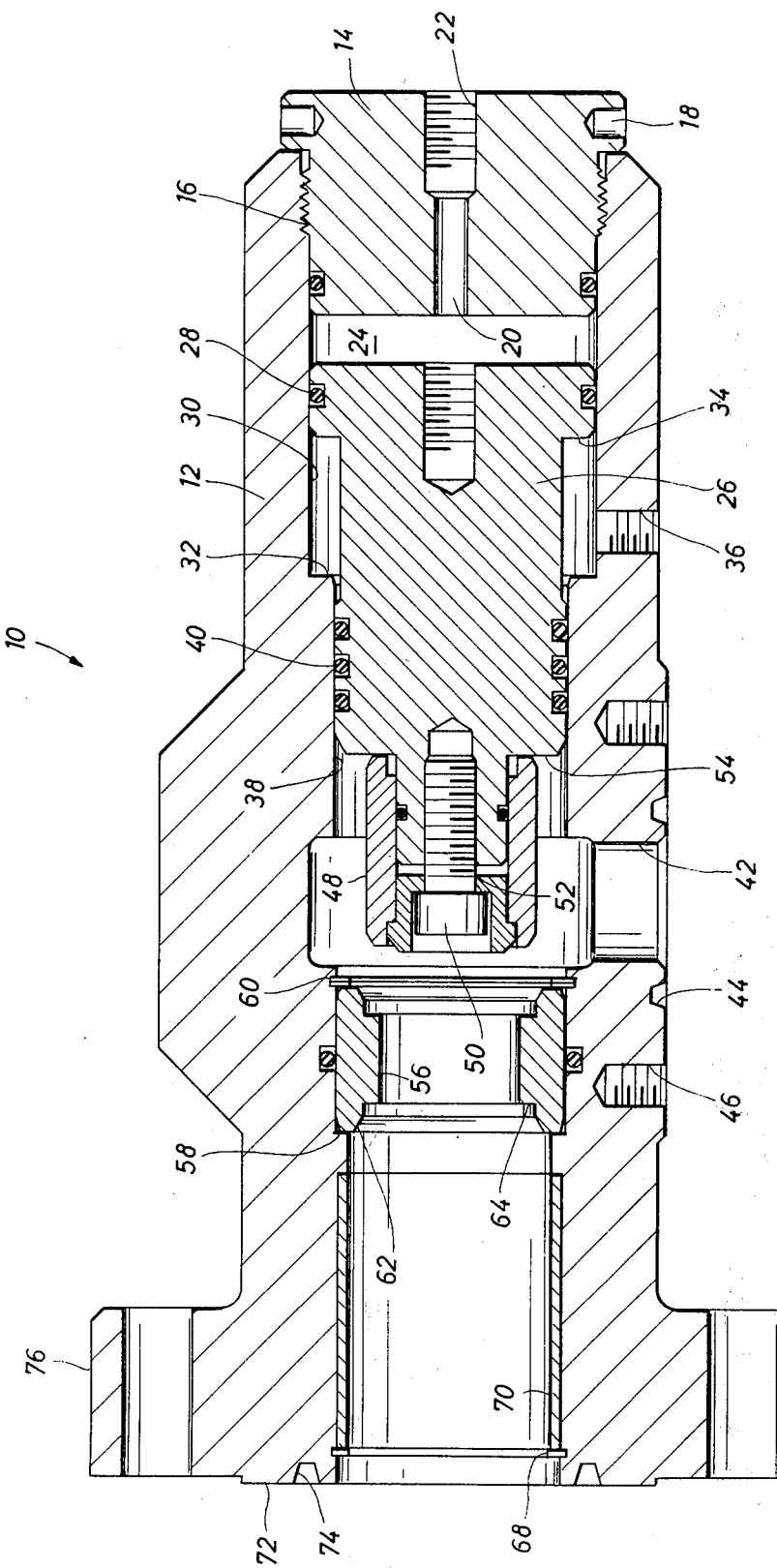
FIG. 1 is a sectional view taken through a diameter of the choke assembly of the present invention illustrating details of construction.

The choke of the present invention is identified by the numeral 10 and incorporates an elongate, tubular body 12. The body 12 is closed at one end by a plug 14 which is joined to the body 12 at a set of threads 16. The plug is provided with a pair of drilled openings 18 to enable it to be grasped by a spanner wrench to be removed. The plug is axially drilled with a passage 20 which passage is exposed to the exterior at a threaded opening 22 to enable it to be connected with a fluid line terminating in an appropriate threaded fitting. Pressurized fluid at a selected pressurized level is introduced through the passage 20 and fills a chamber 24. The chamber 24 is pressurized to a desired level for reasons to be set forth. The plug defines one end of the chamber 24, and a piston is received therein. The piston has a surrounding seal 28 which seals against leakage along the piston wall 30. The piston wall 30 terminates at a shoulder 32. The piston as shown is equipped with a protruding surrounding shoulder or extension 34. The extension 34, in conjunction with the facing shoulder 32, defines a circular chamber acting on the backside of the piston. A passage 36 which is appropriately tapped with threads is formed in the wall of the housing 12. This enables pressurized fluid to be introduced. The piston thus is made double acting by selectively introducing pressurized fluid on both faces thereof. It will be appreciated that the surface area of the shoulder 34 is less than the exposed space in the chamber 24, and, accordingly, a higher pressure is required to pressurize the piston from the left.

The piston extends into an axial passage 38 of reduced diameter. Several O-rings 40 serve as seals preventing leakage. To the left of the seals 40, the piston is exposed to the mud flow. To the right of the seals 40, it is exposed to the fluid introduced under pressure. This is the fluid for actuating the choke as will be described.

The numeral 42 identifies a laterally extending passage which is a port for the introduction of mud at high pressure. It is the inlet port for the choke 10. The opening 42 is encircled by a groove 44. The groove 44 receives a seal ring. The seal ring is clamped against a fitting which is connected to the passage. The fitting, itself, is preferably equipped with a flange which has a number of bolt holes drilled in it which match the location of the tapped openings 46. These enable the flange to be bolted to the body 12, the body being provided with a flat face in the vicinity of the port 42.

The numeral 48 identifies a sleeve which is affixed to a central plug on one end of the piston 26. The sleeve 48 is the valve element for closure of the choke. It will be observed that the sleeve 48 is symmetrically constructed at the right and left-hand ends. It is hollow to fit over the circular appendage affixed to the piston 26. The sleeve 48 is preferably formed of a hardened metal, such as tungsten carbide particles embedded in a base material. It is made wear resistant. It is equipped with a tapered leading edge. It is axially hollow. This enables it to be reversed on installation. It is for this reason that the right and left-hand ends are identical.

The sleeve 48 is fastened in place by a bolt 50. The bolt 50 threads axially into a tapped opening formed in the piston 26 for that purpose. The bolt, itself, seats into a cup-shaped washer 52. The washer 52 has an encircling shoulder which clamps the sleeve 48 in place. It will be noted that the sleeve 48, at each end, is undercut with a shoulder which enables the shoulder to receive the washer 52 to lock the sleeve in place. Further, the sleeve 48 is jammed against a transverse shoulder 54 at the exposed face of the piston. This limits its travel. As a consequence, the components are assembled and held in position for operation in the manner to be described.

The sleeve 48 serves as a valve element. It is positioned against a valve seat which is a removable insert indicated by the numeral 56. The valve seat 56 is a hollow sleeve. It is symmetrically shaped at the right and left-hand ends. At the left-hand end, it abuts a shoulder 58. At the right-hand end, a snap ring 60 is used to lock it into position. The snap ring 60 is received in a groove. The snap ring locks the sleeve against the shoulder 58. The seat 56 is formed of hardened material, including tungsten carbide. The tungsten carbide material is embedded as small particles in a supporting base metal which is, itself, a hard alloy. The seat 56 fits snugly in an axial passage extending from the enlarged chamber communicated with the port 42. The sleeve is provided with tapered faces 62 at each end. The tapered face serves as a valve seat which operates in conjunction with a shoulder 64 to receive and seal on movement of the tapered plug 48 against the seat. The precise manner of sealing is described later. The sealing action is self-cleaning, as will be described. This chokes off flow through the assembly 10. In the illustrated position, the valve element 48 is spaced from the valve.

The seat 56 is reversible. The sleeve is easily reversed by removing the snap ring 60 and sliding the sleeve out, reversing it and restoring it to the seated position shown in FIG. 1. As will be understood, the bulk of the wear occurs at the upstream end, and very little wear occurs at the downstream end. It is for this reason that the sleeve can be reversed periodically to enable the device to have extended life.

The seat 56 locks against a downstream shoulder 58 as described. This limits its travel and specifies its location. This enables the sleeve to remain stationary as the piston 26 telescopes into the area adjacent to the sleeve bringing the valve element 48 towards a sealing or choking position. It will be understood that the valve element 48 is not always closed against the valve seat 56, but, rather, it is moved to a spaced location constricting flow. When the flow is constricted, the flow is choked by the valve in a manner determined by the operator.

The left-hand end of the body 12 is axially drilled with a passage, and an internal groove is formed for receiving a snap ring 68. The snap ring 68 holds in position an internal sleeve 70. The sleeve 70 is the downstream outlet sleeve of the apparatus. The body device terminates at a face 72 which is grooved at 74 to receive a seal ring. A surrounding flange 76 enables it to be connected with a mating flange constructed according to industry standards, and suitable holes are provided on a bolt circle to enable the body 12 to be joined to the connective apparatus.

The sleeve 70 is made of a hardened material, but it does not have to be as hard as the material used in the seat 56. It is also made thinner. At this point in the choke, the flow of mud is basically axial. Therefore, the sleeve 70 is not exposed to the brunt of the abrasive action which normally occurs in the valve apparatus.

In operation, the device is connected in a mud line by affixing the inlet line to the port 42, and an outlet line is connected to the flange 76 at the left-hand end of the equipment. Additionally, fluid control lines are connected to the threaded and tapped openings 22 and 36. A convenient technique is to connect a pressure accumulator topped with a gas (sometimes over a liquid) to the tapped opening 36. When a suitable hydraulic pressure is introduced through the opening 22, the piston is forced to the left. When that pressure is reduced, the accumulator controls the pressure on the piston to force the piston to the end of its movement. Moreover, this is a fail safe apparatus; should the fluid pressure at the fitting 22 be lost for any reason whatsoever, the piston slams wide open.

The valve element and the valve seat jointly have facing tapered edges. As they close to a gap which might pinch or clamp on a sand particle, the seat and valve element open to a wide gap downstream. Thus, any throttling which occurs is between a pair of concentric, tapered surfaces which are aptly suited for long wear. The wear which does occur is limited because the choked flow is, in fact, almost parallel to the tapered faces through a gap defined by the tapered faces.

Full closure is achieved at the facing perpendicular seats. They are fairly well protected from the flow by the position of the valve and seat in the choke position. As the valve is closed toward the seat, the tapered, opposing surfaces 62 and 110 come toward one another. They close flow, and, if sand particles can get into the gap during closure, the wider gap between facing perpendicular faces is flushed to wash away the debris. Large particles are blocked upstream of the tapered faces and do not enter the seat area when the plug enters the seat area. The valve element thus chokes mud flow upstream of the seating surfaces. Full closure is obtained on flat, facial contact, free of sand particles and the like. The valve element thus does not close fully and does not fully constrict on its outer cylindrical surface until the mud-borne particles are flushed out of the space between the facing perpendicular shoulders by the jetted flow through the tapered faces. As will be noted, the sleeve 48 enters fully within the seat 56 to seat and seal. This requires that the tapered end portion 110 of the valve telescope into the seat for closure by contacting the perpendicular faces 64 and 112 together. The valve has maximum diameter sliding into the seat, itself, to plug and close the valve seat area.

Mud flow is introduced through the passage 42. It impinges directly on the sleeve 48. The mud is highly abrasive and tends to wear the sleeve, but the wear is resisted by the use of an extremely hard material in the sleeve. The mud flow, of course, if diverted to the left and out through the axial passage. The flow of mud is through the controlled gap between the sleeve 48 which serves as a valve element and the seat 56 which serves as a valve seat. The position of the element 48 is thus controlled by the movement of the piston to regulate or choke the flow. As the flow is choked, the apparatus 10 serves its intended purpose. More importantly, it has extended life. That is to say, it is able to choke the mud flow while tolerating a certain amount of wear, but, at the same instant, the wear rate is materially reduced. The wear is basically localized in the sleeve 48 and the seat 56. The two replaceable sleeves are, for this reason, made of hard materials and are replaceable. When the two sleeves wear out, the apparatus can be disassembled quickly and easily and the sleeves reversed. They are provided with duplicate ends. The worn end is switched away from the point of wear, the point of wear being the facing surface for the valve element and the valve seat.

Figure 2:
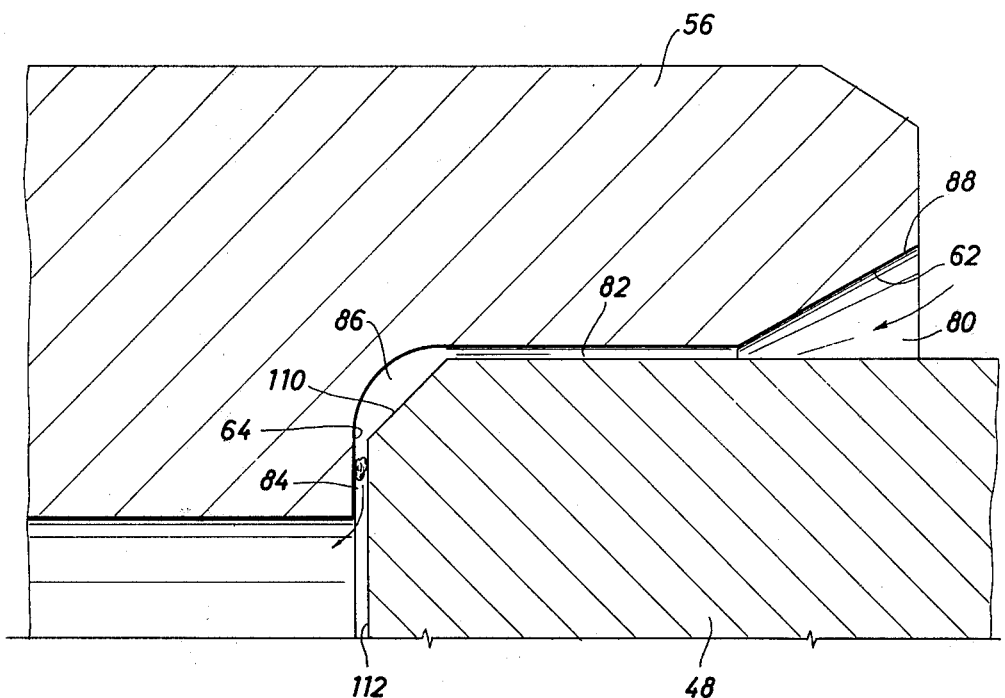
FIG. 2 is a greatly enlarged, detailed view in section showing how the choke assembly closes for the purposes of illustrating how the flow, with or without particulate matter therein, is choked.

FIG. 2 is a very enlarged view of the components as they come together. In FIG. 2 of the drawings, the sleeve 48 is shown in enlarged view. The enlarged view of the sleeve 48 positioned in the removable insert 56 depicts how closure is achieved. Attention is directed to three particular areas which disclose unique features. First of all, immediately prior to full closure, the flow of mud through the funnel-shaped area 80 permits mud, but not particles, to flow into the slot between the two components. Immediately prior to full shut-off, such mud flow is funneled into a narrow constriction. The mud, itself, will flow through this funnel-shaped area 80 and into the constricted passage. Particles in the mud of a size to cause damage will not enter the passage because they will not pass through the narrow passage. More than an adequate flow of mud gets into the passage and flows under pressure to flush out any particles in transit through the passage.

Mud flow is thus introduced from the funnel-shaped area 80 and fully surrounds the sleeve 48, flowing into the narrow, slotted passage 82. The passage 82 is, in fact, a narrow, constricted passage. It has a clearance sufficient that the mud flowing through it is able to flush out any particles that might have been caught in the passage area 82 prior to closure of the components. The passage is about 0.002 to 0.004 inches in width and has the form of a complete circle.

The numeral 84 identifies a third area. This flow area is between the perpendicular facing shoulders 64 and 112 on the two components. The area 84 is flushed by the flow from the concentric passage 82. As an example, if a piece of particulate trash is caught in the passage 84 during closure, it is flushed away. This is achieved during closing movement of the plug valve mechanism. At some point in time during closure, the passage 84 is wider than the passage 82. The passage 82 is limited or fixed in width during the time the passage 84 is being narrowed in width. This means that no new particles are being introduced into the passage 84. As the components move closer together so that the passage 84 narrows, when it becomes more narrow, additional particles are not introduced because they are caught at the funnel 80. The absence of new particles means that particles previously in the passages, including the exemplary particle shown in FIG. 2, are flushed away. The mud flows much faster as the passage 84 is reduced in size. This leaves opposing metal shoulders 64 and 112 which are parallel to one another cleared of trash particles for closing contact. Contact is easily achieved. Once contact is achieved, contact will clearly prevent any further fluid-borne particle flow, and the two metal faces 64 and 112 can come together, and they are not held open by small particles lodged between them. As explained by the foregoing, closure is achieved timely after flushing.

FIG. 2 thus discloses an arrangement whereby flushing of particles is achieved at the instant before closure. Closure, itself, has a self-cleaning operation. As the faces 64 and 112 are brought closer together, the passage 82 does not change diameter. The flow capacity through the passage 82 is approximately constant, presuming that a constant pressure head is maintained upstream. As the passage 84 is closed, the velocity through it increases prior to cutoff. As the effective cross-sectional area of the passage 84 is reduced toward zero, the flow rate increases to thereby provide enhanced scavenging and cleaning so that all particles are removed. The net result is that the faces 64 and 112 which come together in the passage 84 are flushed clean the instant before closure.

The procedure described above is most effective in closing the two components together with a reduced wear rate. Wear is encountered as a result of the abrasive nature of the particles carried in the drilling mud. To this end, the sleeve 48 is preferably chamfered at its corner 110. If it is chamfered, it creates a flow cavity at 86 of redirected velocity. As the flow enters this area, it must turn, but it is turning in a larger area, and, accordingly, the velocity drops somewhat to enable the flow to turn. As the velocity drops, erosion of the components at this area is reduced. Accordingly, the sleeve is chamfered to enlarge the cavity 86, and the insert 56 has an internal corner which is rounded, as shown in FIG. 2, to some desired radius. This protects the corner of both components against erosion. The flow area 86 thus accommodates a turn of the flow with minimum damage to the components, and this, thereby, prolongs the life of the equipment.

Pressures up to 5,000 psi. are often encountered. In some conditions, the pressure drop across the choke may exceed that and can occasionally go as high as 10,000 psi. In light of the fact that upwards of 1,000 gallons per minute of mud (laden with particles of all sizes) flows through the choke, it will be understood that this is an extremely severe operating condition. When the choke is open, it will be observed that the chamfer on the corner of the sleeve 48, in conjunction with the internally chamfered surface 62, is particularly helpful. When they (the valve and valve seat) are spaced apart during an open flow condition, they direct the flow of well fluids flowing between the two toward the centerline of the choke, away from the two sleeves, thereby reducing wear on these two components.

No precise angle is given for the chamfered faces; they can be adjusted accordingly. Moreover, they are shown as surfaces of rotation of a straight line; they can be curved if desired.

It is perhaps desirable that the faces 64 and 112 in the passage 84 be ground and lapped so that they are parallel and able to form a metal-to-metal seal. Dimensional control to maintain the circular passage 82 is also preferred. It is, thus, desirable that the movable components be axially aligned concentric relative to the fixed, central components. These factors are, in part, dependent on the size of particles which are likely to scar the metal parts. It will be understood that some particles are so small as to be meaningless.

Figure 4:
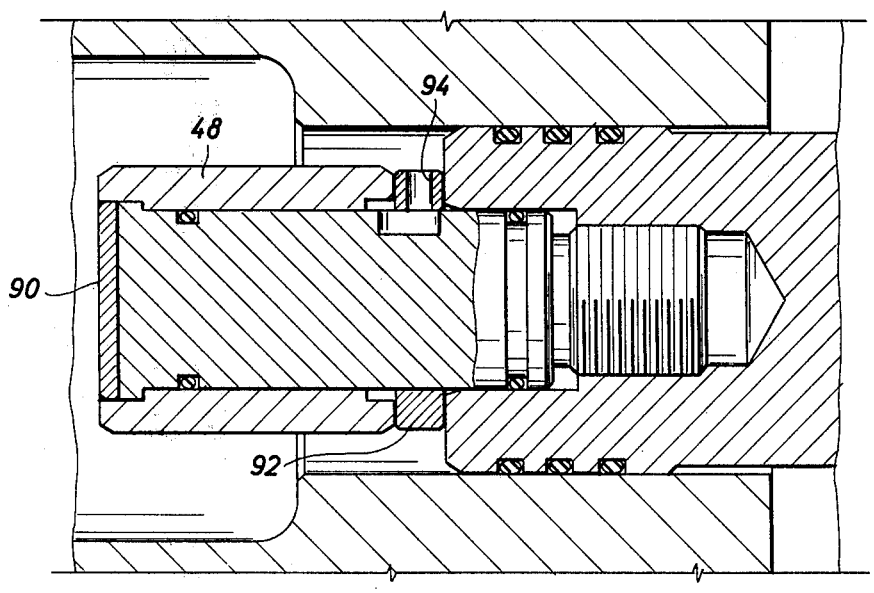
FIG. 4 is an alternate embodiment showing modified mounting of the movable components in the choke assembly.

Attention is next directed to FIG. 4 of the drawings. FIG. 4 is an alternate embodiment of the disclosed invention incorporating an end plate 90. The end plate 90 prevents abrasion or wear which might otherwise impinge on the end of the apparatus shown in FIG. 1. Again, this is desirable to prevent substantial damage to the device. The end plate 90 is very useful in the prevention of wear and damage and provides longer life.

FIG. 4 further differs in that a central mounting bolt is not used. Rather, an encircling, spacer lock ring 92 is placed at the back of the sleeve 48, and a pin or set screw passes through the spacer ring at 94. This locks the ring. This is an alternate method of assembly. The use of a spacer ring is helpful to provide pressure against the face of the removable sleeve 48 fully surrounding its circumference.

Figure 3:
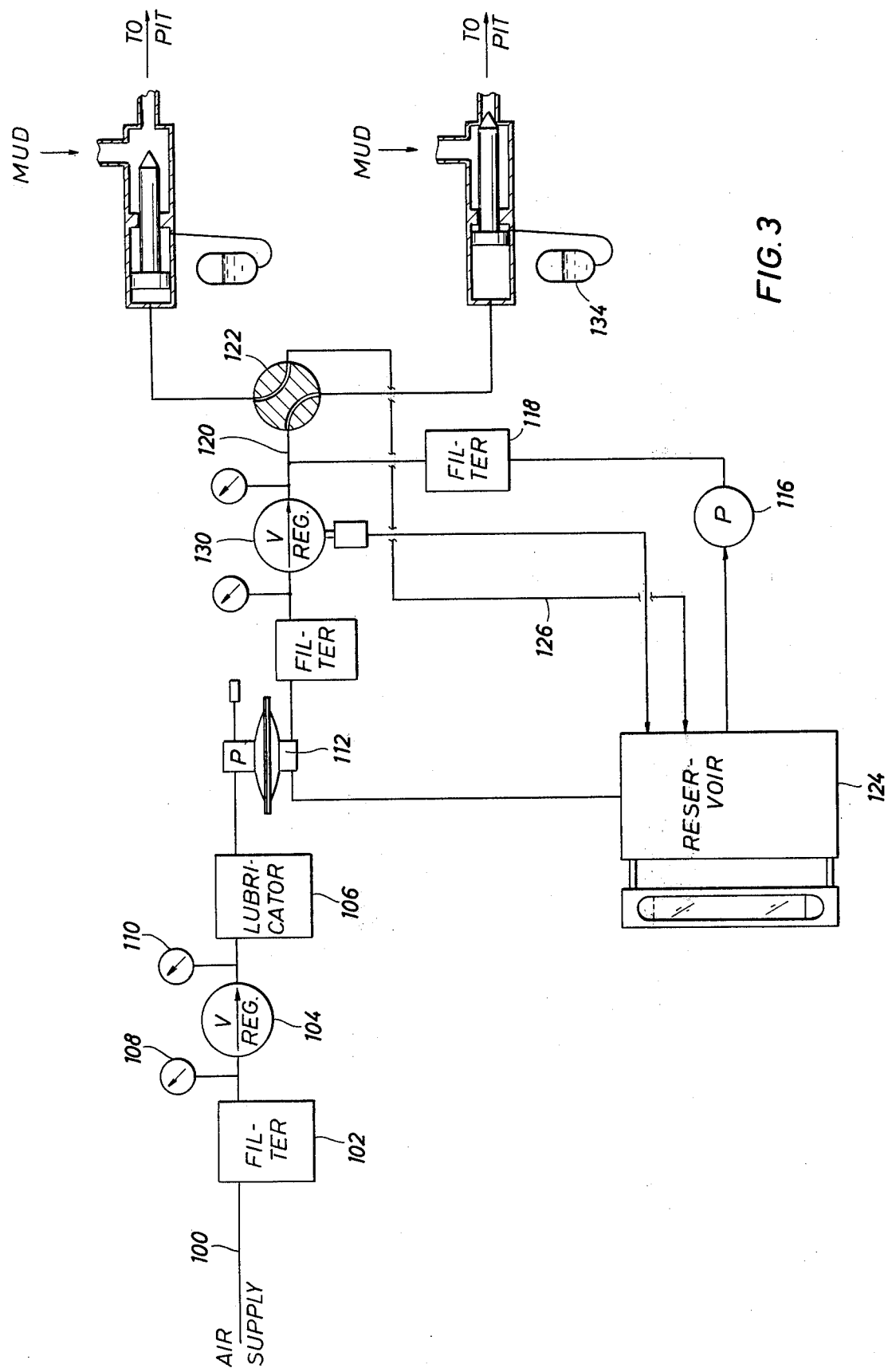
FIG. 3 is a schematic flow diagram of a hydraulic control apparatus for a choke.

FIG. 3 of the drawings should be considered next. FIG. 3 discloses a system for operation of the equipment. In FIG. 3, alternate mud chokes are shown. In addition, a power system for their operation is also depicted. Briefly, a pneumatically powered system is shown, although other systems can be used. An air powered hydraulic pump operates the choke with oil from a reservoir.

An air supply line connects through a filter. The line is identified by the numeral 100 and is connected to a filter 102 which, in turn, is connected to a pressure regulator valve 104. Suitable quantities of lubricating oil are introduced at 106, and pressure gauges are found at 108 and 110. The pressure gauges 108 and 110 provide the operator with an indication of pressure levels. The lubricator delivers air under pressure to one side of a diaphragm pump mechanism. The diaphragm operated, air driven pump mechanism 112 is in a hydraulic circuit to force regulated pressure to a choke. The hydraulic circuit includes an emergency pump 116. The pump 116 is an emergency hand powered high pressure oil pump connected to a filter 118 which, in turn, connects to a line 120 which, in turn, passes through a control valve 122. The valve 122 is a two-position, four-way valve. It is provided with a high pressure inlet line. Additionally, it provides an alternate line to a sump, the sump being indicated at 124. The sump line is 126. The reservoir 124, of course, is maintained at minimum pressure, ordinarily atmospheric pressure. System pressure is adjusted by operation of the regulator 130, which, in turn, controls the hydraulic oil pressure to the chokes. This regulator 130 is connected to the two-position valve 122.

Most mud pump systems include duplex pumps and two or more pumps connected to a duplex choke arrangement. Two such chokes are shown symbolically in FIG. 3 of the drawings. The two chokes are used selectively and alternately, depending on the mud flow. It is desirable to always have a back-up choke.

The chokes shown in FIG. 3 are preferably the chokes depicted in the present disclosure, and each one has a hydraulically driven piston in it, as previously stated. For convenience, a pressure accumulator 134 can be used to provide a return force for operation of the chokes. The pressure accumulator is partly filled with incompressible fluid and partly with compressible air or some other gas so that a return stroke can be effected even should all the pneumatic or hydraulic equipment fail. Ordinarily, it is better to have the device move to an open position on failure.

The illustrated system provides operative power to the mud chokes, particularly when installed in a duplex system. The open choke can be modulated by varying the position of the movable element 48 in response to the regulator valve 130.

The foregoing is directed to the preferred embodiment, but the scope of the present invention is determined by the claims which follow.

I claim:

1. A choke for controlling the flow of mud which comprises:
   a hollow valve body having a passage therethrough;
   a valve seat having an encircling, tapered face surrounding an axial passage past said tapered face for directing mud flow past said tapered face within said valve body;
   an encircling valve seat shoulder axially spaced from said tapered face lying in a plane perpendicular to the flow through said axial passage;
   a valve element having an external tapered face conforming to said valve seat tapered face which said valve element, on movement, moves from a spaced position into a concentric, centrally positioned first throttling location within said valve opposite said valve seat tapered face and which said valve element and said valve seat tapered faces define a gap therebetween for throttling mud flow passing through the gap, and wherein said valve element controllably blocks the axial passage flow of mud past said valve seat on further movement of said valve element toward said valve seat shoulder defining a second throttling location having reduced flow compared to said first throttling location;
   a surrounding shoulder on said valve element which shoulder is adapted to conform to and seat against said valve seat shoulder to plug and close the flow of mud through the gap between said valve element and said valve seat, said shoulder further moving toward said valve seat shoulder for closure;
   means for moving said valve element into a fully closed position relative to said valve seat; and
   inlet and outlet means communicating with said passage through said valve body.

2. The apparatus of claim 1 including a piston having a protruding end portion equipped with a detachable means for mounting said valve therein for axial telescoping movement into and out of engagement with said valve seat.

3. The apparatus of claim 2 including a cylinder surrounding said piston and aligning it for sealing movement into and out of contact with said valve seat.

4. The apparatus of claim 3 including a hollow body having an axial passage for receiving and supporting said valve seat therein.

5. The apparatus of claim 4 including a port opening into said hollow body introducing a flow of fluid toward said valve seat and a second port downstream from said valve seat which serves as an outlet.

6. The apparatus of claim 4 including an elongate body of circular cross section which terminates in an end portion serving as said valve element and which body is mounted on said piston, said piston incorporating a bolt means centered therein which removable bolt clamps said valve body in place.

7. The apparatus of claim 6 including lock means which clamps said valve seat into a fixed position relative to said valve element, said lock means comprising a latch means for an elongate, hollow sleeve comprising said valve seat.

8. The apparatus of claim 7 wherein said sleeve is double-ended and duplicated at both ends, each end including said valve seat and being reversible to enable said sleeve to be repositioned and thereby allowing use of both ends.

9. The apparatus of claim 8 wherein said valve element is a portion of a removable part which is provided with duplicate ends and is reversibly received in said choke to enable both ends to function as a valve element.

10. The apparatus of claim 1 wherein said valve seat and said valve element include concentric, cylindrical surfaces spaced apart by a specified distance such that said valve element fits within said valve seat with clearance defined by the specified distance.

* * * * *